United States Patent  [15] 3,687,341
Stanley et al.  [45] Aug. 29, 1972

[54] METERING DISPENSING CLOSURE

[72] Inventors: Thomas R. Stanley, Brookfield; Carmen T. Mascia, Westchester, both of Ill.

[73] Assignee: Continental Can Company, Inc., New York, N.Y.

[22] Filed: Dec. 21, 1970

[21] Appl. No.: 100,265

[52] U.S. Cl. ............................................. 222/455
[51] Int. Cl. ........................................ G01f 11/26
[58] Field of Search ....... 222/455, 447, 425, 449, 426

[56] References Cited

UNITED STATES PATENTS 2,517,161  8/1950  Anderson ............. 222/425 X
1,687,705  10/1928  Androff .................... 222/455

Primary Examiner—Stanley H. Tollberg
Attorney—Diller, Brown, Ramik & Holt

[57] ABSTRACT

This disclosure relates to a metering dispensing closure in which a pair of chambers are selectively placed in fluid communication with each other by an axially movable gravity actuated valve housed in one of the chambers. The valve includes a pair of diametrically opposite ports which are alternately in and out of registration with ports formed in the chamber housing the valve. When the closure is inverted a first of the chambers receives a predetermined quantity of a packaged product and upon reversion and subsequent inversion the predetermined quantity is transferred to a second of the chambers and dispensed through a port thereof to atmosphere.

13 Claims, 5 Drawing Figures

Patented Aug. 29, 1972
3,687,341
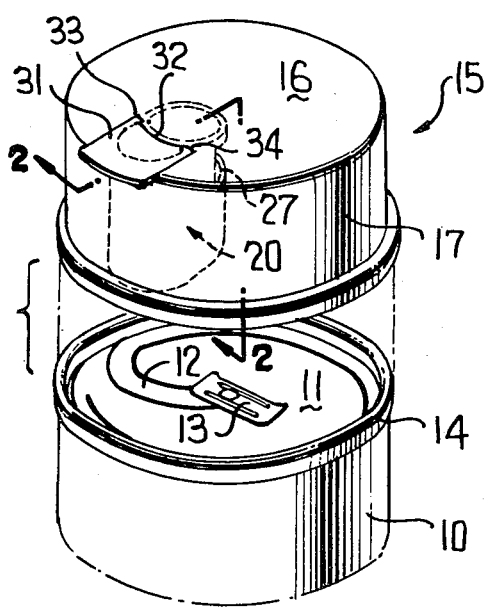
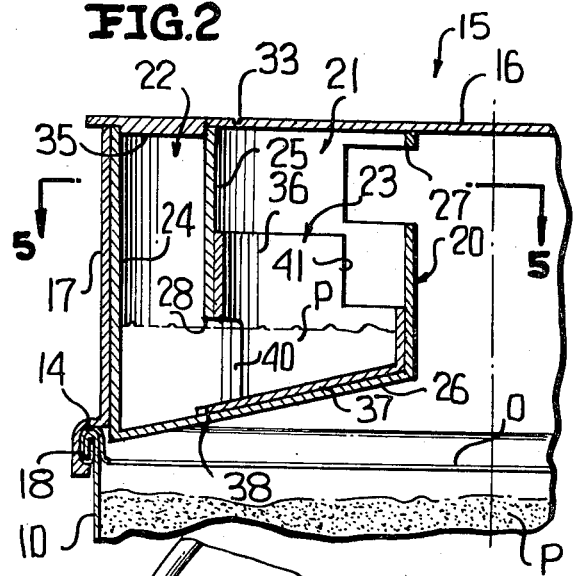
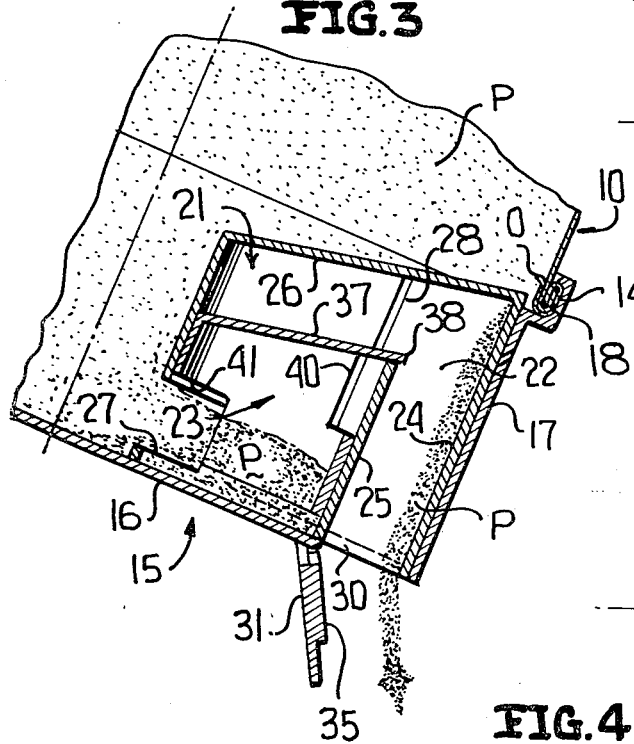
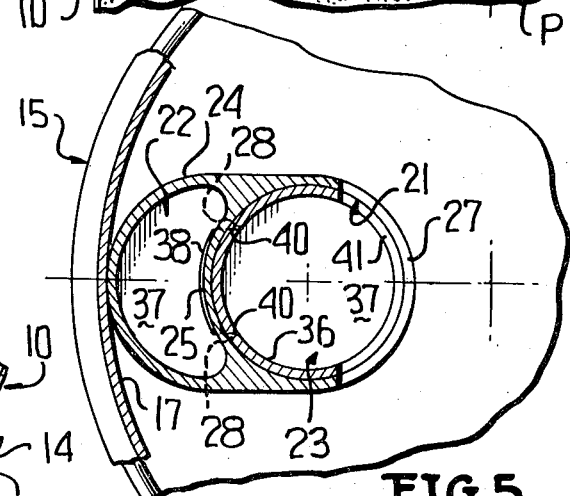
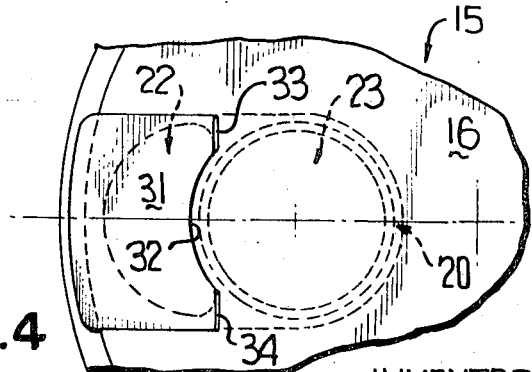
INVENTORS
THOMAS R. STANLEY
& CARMEN T. MASCIA
By Diller, Brown, Ramik & Holt
ATTORNEYS

METERING DISPENSING CLOSURE

A primary object of this invention is to provide a novel metering dispensing closure which is adapted to be interlocked upon the double seam of a closure having a full-opening end unit and packaged with pulverant or granular material, the closure including first and second chambers and valve means for selectively placing the first and second chambers in fluid communication with each other, and a plurality of port means for selectively placing the chambers in communication with each other whereby simply inverting, reverting and subsequently again inverting the closure results in the dispensing of a predetermined quantity of the product from the associated container to atmosphere.

A further object of this invention is to provide a novel metering dispensing closure of the type aforesaid wherein the valve means is mounted for gravity actuated sliding movement internally of a first of the chambers.

Still another object of this invention is to provide a novel metering dispensing closure of the type heretofore set forth wherein first and second ports formed in a wall of the first chamber define a flow path for a product from the container to a second of the chambers, while the valve means includes a port normally in registration with the second of the ports of the first chamber for permitting the flow of the product from the first to the second chambers incident to a dispensing operation.

Still another object of this invention is to provide a novel metering dispensing closure of the type aforesaid wherein the valve means includes an annular valve body closed by a bottom wall, and a portion of the bottom wall projects into the second port of the first chamber whereby the second port is closed in the inverted position of the closure.

With the above and other objects in view that will hereinafter appear, the nature of the invention will be more clearly understood by reference to the following detailed description, the appended claimed subject matter, and the several views illustrated in the accompanying drawing.

IN THE DRAWING:

FIG. 1 is a fragmentary exploded view of a container having a full opening end unit, and illustrates the metering dispensing closure of this invention prior to being secured to the double seam of the container with a hingeable dispensing cap in its closed position.

FIG. 2 is a fragmentary sectional view taken generally along line 2—2 of FIG. 1, and illustrates first and second chambers, a valve in the first of the chambers, and a product in both chambers after the closure has been once inverted and returned to its original position.

FIG. 3 is a fragmentary sectional view similar to FIG. 2, and illustrates the product being dispensed to atmosphere during which time an additional quantity of the product is received in the first chamber.

FIG. 4 is a fragmentary top plan view of the closure, and illustrates the details of the hingeable dispensing cap and a common wall between the first and second chambers.

FIG. 5 is a fragmentary sectional view taken generally along line 5—5 of FIG. 2, and more clearly illustrates the manner in which the valve is slidably mounted within the first chamber and a portion of the bottom wall of the valve projecting through a port of the common wall between the chambers for closing communication therebetween.

A conventional container is generally indicated by the reference numeral 10 in FIG. 1, and includes a full-opening end unit 11 provided with appropriate score lines 12 and a pull tab 13. The periphery of the end unit 11 is secured to the container body by a conventional double seam 14. Upon the removal of the end unit 11 in a conventional manner, a generally circular opening O (FIG. 2) is formed to permit a granular or pulverant product P to be dispensed from the container 10 in a manner to be described more fully hereafter.

Associated with the container 10 is the novel metering dispensing closure 15 of this invention which includes a generally circular end panel 16 and a depending peripheral skirt 17 which terminates at a lower end portion in a generally radially inwardly opening peripheral groove 18. The seam 14 of the container 10 is snap-fit in the groove 18 and the thus assembled container 10 and closure 15 reach the ultimate consumer. The container 10 or the closure 15 includes appropriate instructions advising the consumer that the closure 15 must be first removed, the end unit removed from the container 10, and the closure 15 reapplied thereto prior to a dispensing operation. As an alternative arrangement, the closure 15 could be snap-secured to the bottom double seam (not shown) of the container 10 in which case the end unit 11 is exposed. In this case appropriate instructions would advise the consumer to remove the closure 15 from the bottom seam of the container, remove the end unit 11, and apply the closure 15 to the upper double seam 14 incident to a dispensing operation.

Wall means, generally designated by the reference numeral 20, define first and second chamber means 21, 22, respectively, which are selectively placed in fluid communication with each other by valve means 23. The wall means 20 includes a generally annular wall 24 (FIG. 5) of an oval-shaped configuration in transverse section with opposite sides thereof (unnumbered) being bridged by a wall 25 common to the chambers 21, 22. The curvature of the common wall 25 thereby imparts a generally moon-shaped transverse cross-sectional configuration to the chamber 22 and a circular cross-sectional shape to the chamber 21, as is best illustrated in FIG. 5 of the drawing. A common generally oval-shaped bottom wall 26 closes the bottoms of the chambers 21, 22 (FIG. 2).

The first chamber 21 includes first port means 27 formed by the removal of a generally annular portion from the wall 24 adjacent the end panel 16. Like second port means 28 in the form of a removed annular portion is provided in the common wall 25 adjacent the bottom wall 26 and in generally diametrically opposed relationship to the first port 27. With the valve 23 in its lower position (FIG. 2) the interior of the container 10 is placed in fluid communication with the second chamber 22 through the chamber 21 and the valve 23.

Third port means 30 (FIG. 3) is defined by the uppermost end portion of the second chamber 22, and is normally closed by a hingeable closure cap or flap 31 (FIG. 4) of a generally rectangular configuration except for a shallow concave severance line 32 between a pair of hinge lines 33, 34 which permit the pivoting or hinging movement of the cap 31 between its normally closed position (FIGS. 2 and 4) to the open position (FIG. 3) thereof. The cap 31 includes a projecting boss 35 (FIGS. 2 and 3) at its lower surface which is contoured to the transverse cross-sectional configuration of the second chamber 22 and seats within the third port 30 in the closed position. An end portion (unnumbered) of the cap 31 remote from the hinge lines 33, 34 projects beyond the outer surface of the peripheral skirt 17, as best illustrated in FIGS. 1 and 4, to provide a finger-grip for facilitating the gripping of the cap 31 incident to the opening of the port 30.

The valve 23 is likewise defined by a generally annular wall 36 which is closed at its bottom by a generally circular bottom wall 37 having a portion 38 which projects into the port 28, as is best illustrated in FIGS. 2 and 5. Fourth port means 40 are provided in the annular wall 36 of the valve 23 by the removal of a generally annular shaped portion thereof adjacent the bottom wall 37 with the ports 28, 30 being in registration in the lower position of the valve 23 (FIG. 2). Fifth port means 41 are provided in the valve 23 diametrically opposite the fourth port means 40 by a like removal of a portion of the annular wall 36. The port 41 is in registration with the port 27 in the position of the valve 23 illustrated in FIG. 3.

A metered quantity of the product P in the container 10 is dispensed by first inverting the assembled container 10 and closure 15 which causes the valve 23 to drop by gravity to the position shown in FIG. 3 bringing the ports 27, 41 into registration while closing the port 28 by the portion 38 of the wall 37. Product flows into the chamber 21 through the registered ports 27, 41, and upon returning the combined container 10 and closure 15 to the original upright position the product drops downwardly, as does the valve 23, to the position shown in FIG. 2 at which time a portion of the product within the chamber 21 and the valve 23 is delivered into the chamber 22 through the now registered ports 28, 40. At this time the cap 31 is open and the united container 10 and dispensing cap 15 are again inverted from the position shown in FIG. 2 to that shown in FIG. 3 at which time the product within the chamber 22 is dispensed to atmosphere through the port 30. At the same time the valve 23 moves under the influence of gravity toward the end panel 16 to the position shown in FIG. 3 with the ports 27, 41 once more in registration thus admitting another portion of the product P into the chamber 21 and the valve 23. When returned to the position shown in FIG. 2 the valve 23 moves downwardly and the dispensing process may be repeated in the manner described. It is to be particularly noted that during the inverting and reverting of the container 10 and the dispensing closure 15 in the manner described the portion 38 of the valve bottom wall 37 performs the dual function of guiding the reciprocal movements of the valve 23 as the wall portion 38 moves in the port 28, and also selectively opens and closes the same, as shown in FIGS. 2 and 3, respectively.

While preferred forms and arrangements of parts have been shown in illustrating the invention, it is to be clearly understood that various changes in details and arrangement of parts may be made without departing from the spirit and scope of this disclosure.

We claim:

1. A metering dispensing closure comprising a closure body having an end panel and a depending peripheral skirt, wall means defining first and second chambers, valve means for selectively placing said first and second chambers in fluid communication with each other, first port means for admitting a product into said first chamber, second port means for discharging a product from said first chamber to said second chamber, third port means for discharging a product from said second chamber to atmosphere, said valve means includes fourth port means in the flow path between said first and second port means in a first position of said valve means, said second and fourth port means being in registration in said first position, said valve means being movable to a second position at which said second and fourth port means are out of registration, and said fourth port is disposed above said second port in said first position at which said closure is in an upright position.

2. The metering dispensing closure as defined in claim 1 wherein said valve means is mounted for gravity-actuated sliding movement in said closure body.

3. The metering dispensing closure as defined in claim 1 wherein said valve means includes means for closing off communication between said first and second chambers in said second valve position.

4. The metering dispensing closure as defined in claim 1 wherein said valve means includes means for closing off communication between said first and second chambers in said second valve position, and said valve means further includes fifth port means in registration with said first port means in said second valve position.

5. The metering dispensing closure as defined in claim 1 wherein said first and second chambers include a common wall, said second port means is formed in said common wall, and said valve means includes a wall disposed within said second port means and generally transverse to said common wall for closing communication between said first and second chambers through said second port means in said second valve position.

6. The metering dispensing closure as defined in claim 1 wherein said first chamber is defined by an annular wall closed at one end by said end panel and at an opposite end by a bottom wall, said first port means is formed in said annular wall adjacent said end panel and remote from said second chamber, said second port means is formed in said annular wall adjacent said bottom wall and diametrically opposite said first port means, and said valve means includes an annular wall housed within said first chamber annular wall and mounted for relative axial sliding movement therein.

7. The metering dispensing closure as defined in claim 6 wherein said fourth passage is formed in said valve means annular wall in registration with said second port means in said first valve position, and said valve means includes fifth port means formed in the annular wall thereof diametrically opposite said fourth port means and in registration with said first port means in said second valve position.

8. The metering dispensing container as defined in claim 7 wherein said valve means annular wall is closed by a bottom wall adjacent said first chamber bottom wall.

9. The metering dispensing container as defined in claim 7 wherein said valve means annular wall is closed by a bottom wall adjacent said first chamber bottom wall, and a portion of said valve means bottom wall projects into said second port means and thereby closes communication between said first and second chambers in said second valve position.

10. The metering dispensing container as defined in claim 9 including a hinged closure normally closing said third port means.

11. A metering dispensing closure comprising a closure body having an end panel and a depending peripheral skirt, wall means defining first and second chambers, valve means for selectively placing said first and second chambers in fluid communication with each other, first port means for admitting a product into said first chamber, second port means for discharging a product from said first chamber to said second chamber, third port means for discharging a product from said second chamber to atmosphere, said valve means includes fourth port means in the flow path between said first and second port means in a first position of said valve means, said second and fourth port means being in registration in said first position, said valve means being movable to a second position at which said second and fourth port means are out of registration, and said valve means includes fifth port means in said valve means diametrically opposite said fourth port means and in registration with said first port means in said second valve position.

12. The metering dispensing closure as defined in claim 11 wherein said valve means includes means for closing off communication between said first and second chambers in said second valve position.

13. The metering dispensing closure as defined in claim 11 wherein said first chamber is defined by an annular wall closed at one end by said end panel and at an opposite end by a bottom wall, said first port means is formed in said annular wall adjacent said end panel and remote from said second chamber, said valve means includes an annular wall housed within said first chamber annular wall and mounted for relative axial sliding movement therein, and said valve means annular wall is closed by a bottom wall adjacent said first chamber bottom wall.

* * * * *